No. 876,426. PATENTED JAN. 14, 1908.
G. W. BELL.
PNEUMATIC SUSPENSION DEVICE FOR VEHICLE BODIES.
APPLICATION FILED FEB. 12, 1906.
2 SHEETS—SHEET 1.
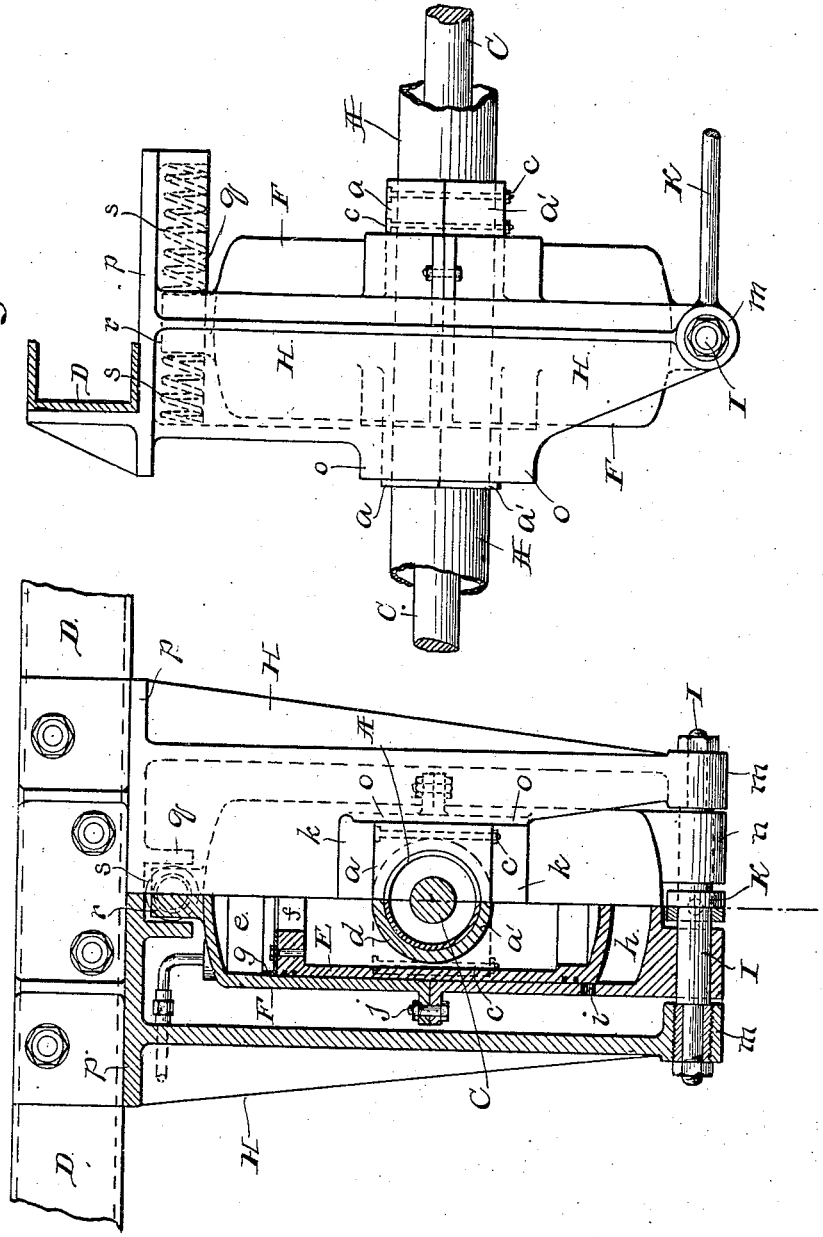
WITNESSES:
INVENTOR.
George William Bell
BY
ATTORNEYS.

No. 876,426. PATENTED JAN. 14, 1908.
G. W. BELL.
PNEUMATIC SUSPENSION DEVICE FOR VEHICLE BODIES.
APPLICATION FILED FEB. 12, 1906.
2 SHEETS—SHEET 2.
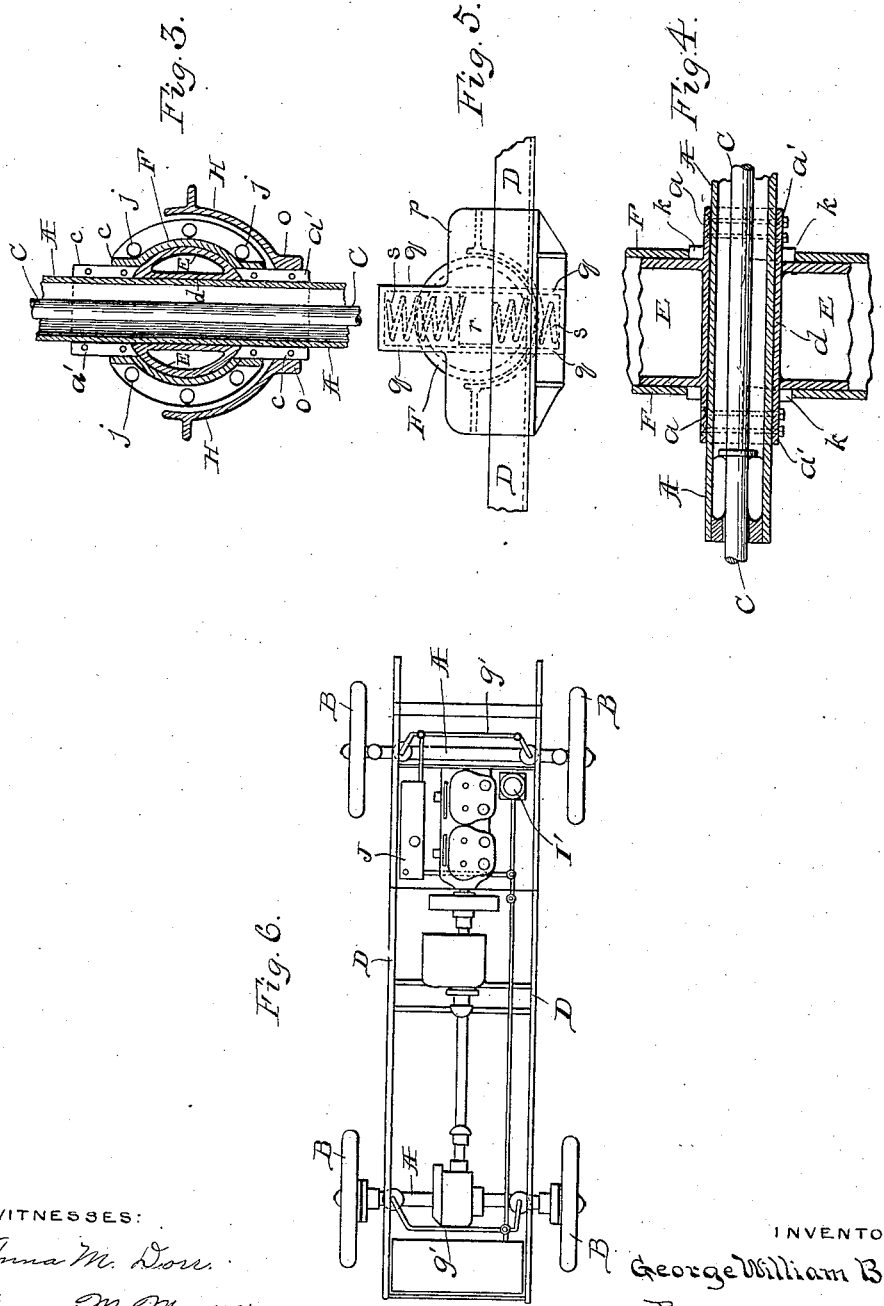
WITNESSES:
INVENTOR
George William Bell

UNITED STATES PATENT OFFICE.

GEORGE WILLIAM BELL, OF LIVERPOOL, ENGLAND.

PNEUMATIC SUSPENSION DEVICE FOR VEHICLE-BODIES.

No. 876,426.     Specification of Letters Patent.     Patented Jan. 14, 1908.

Application filed February 12, 1906. Serial No. 300,559.

*To all whom it may concern:*

Be it known that I, GEORGE WILLIAM BELL, a subject of the King of Great Britain and Ireland, residing at Liverpool, in the county of Lancaster, England, have invented certain new and useful Improvements in Pneumatic Suspension Devices for Vehicle-Bodies, of which the following is a specification, reference being had therein to the accompanying drawings.

This invention more particularly applies to power driven vehicles and has for its object to provide a pneumatic device which will take the place of the usual vehicle springs without altering the construction or arrangement of any other part, and which through its efficiency in absorbing the shocks and vibrations due to travel on ordinary roads permits of dispensing altogether with the use of pneumatically tired wheels, all as more fully hereinafter described and shown in the accompanying drawings, in which Figure 1 shows the device half in elevation and half in vertical section; Fig. 2, shows it in side elevation; Fig. 3, is a horizontal section on a smaller scale on the plane of the axis of the supporting wheels; Fig. 4, is a vertical section in the plane of the axis of the wheels; Fig. 5, is a top plan view being like Figs. 3 and 4 on a smaller scale; Fig. 6, is a diagram plan view of an automobile body provided with my devices.

In the drawings, A represents the axles, B the wheels C the drive spindles journaled in the rear axle and carrying the rear wheels and D the frame of the body of an automobile of known construction except as to the pneumatic suspension devices of the body which form the subject matter of this invention and take the place of the usual springs.

In the usual manner of supporting the body at four points upon the axles there will be four of these devices, but their construction is the same and the following description of one applies to each:

My pneumatic device consists essentially of a hollow piston E secured upon the axle in vertical position and of a cylinder F carried by the frame of the body and in which the piston works and carries the load upon an air spring formed by means of compressed air supplied into the upper end of the cylinder through a supply pipe $g'$ entering into the top of the cylinder.

The piston is provided about midway of its length with a transverse aperture of sufficient size for the axle to pass through it, and at each end of this aperture it is formed with extension $a$ which form the halves of two clamping boxes, the other halves $a'$ of which are formed by separate half boxes, all so arranged that by means of clamping bolts $c$ the piston is firmly clamped in position upon the axle.

The passage in the piston through which the axle passes is separated from the interior space of the piston by an interior wall $d$, and this interior space communicates with the air chamber $e$ on top of the piston through an opening $f$ in the head of the piston which is also provided with a cup leather $g$ and piston rings or other suitable means for making it more air tight in the cylinder.

The cylinder is of suitable length to inclose the whole piston and it forms in addition to the air chamber $e$ on top another air chamber $h$ at the bottom, the latter being provided with a small air port $i$ which is controlled by the piston. For convenience in mounting, the cylinder is cast in halves bolted together by bolts $j$ passing through suitable flanges on the halves and openings $k$ of suitable size are formed in the sides of the cylinder for the free passage therethrough of the clamping boxes within the limit of movement of the piston.

The cylinder is supported in position by means of a pedestal H which is secured to the frame of the body in any suitable manner and carries the cylinder by means of a bolt I passing longitudinally through corresponding ears $m\ n$ formed respectively at the lower ends of the pedestal and cylinder in the longitudinal vertical plane of the cylinder.

The pedestal is preferably bifurcated at its lower portion to a height above the axle and the bifurcations are provided with vertical flanges $o$ which form vertical guides between which the outer one of the clamping boxes project and is guided thereby in its vertical play. The pedestal is of rounded shape in cross section and partly surrounds the cylinder as an outer protection, on top it is formed with a horizontal base plate $p$ and upon the underside thereof are formed two parallel guide flanges $q$ adapted to receive a guide lug $r$ provided on the upper end of the cylinder and held between two springs $s\ s$ pressing against opposite sides and tending to hold the cylinder in its normal position against movement due to vibration of the axle in the direction of its axis.

The bolt I is preferably made to operate as a stay bolt to unite the bifurcated ends of the pedestal together and the two pedestals on the opposite ends of each axle are preferably united by a stay rod K which suitably engages at the ends with the bolts I.

It will be understood that the function of the piston and cylinder is to form an air cushion on the top of the piston adapted to support the load thereon under all conditions of the road. In the static condition of the vehicle the piston would be in its lowermost position with the port $i$ closed, and to maintain this static position, I provide suitable devices on the vehicle comprising an air compressor I', a compressed air reservoir J and suitable air distributing pipes $g'$ leading to the air cushions to provide air of suitable pressure into each cylinder adapted to maintain each piston in a prescribed static position, all of which is well known in connection with devices of this character. The lower air chamber in the cylinder acts merely as a dash pot and check spring combined.

To prevent the cylinder from binding upon the piston, the piston is guided in its vertical movement by the engagement of the outer one of the clamping boxes between the vertical guide flanges $o$ of the pedestal, the cylinder adjusting itself by having a limited play upon the rod I and between the parallel guides $q$ at the upper end.

What I claim as my invention is:—

1. The combination with the vehicle body and a supporting axle, of a piston provided intermediate its ends with clamping boxes on opposite sides thereof securing the same in vertical position upon the axle, an inclosing cylinder forming air chambers at opposite ends of the piston and having openings in its sides for the clamping boxes to permit a relative movement between the cylinder and piston, a pedestal depending from the underside of the vehicle body, supporting connection between the lower end of the pedestal and the cylinder, and means for supplying the air chamber above the piston with compressed air.

2. The combination with the vehicle body and a supporting axle, of a pedestal secured to the underside of the body and having a bifurcated lower portion embracing the axle, a piston secured upon the axle adjacent to the pedestal and extending partly above and partly below the axle, a cylinder in which said piston works and forms air chambers in the opposite ends of the cylinder, the air chamber above provided with means for supplying the same with air under pressure, and a connection pivotally securing the cylinder at its lower end to the pedestal free to adjust itself to any lateral movement of the piston.

3. The combination with the vehicle body and a supporting axle, of a piston carried by the axle and extending vertically partly above and partly below the same, a cylinder in which said piston freely works and forms air chambers in the opposite ends of the cylinder, a pedestal depending from the underside of the vehicle body adjacent to the cylinder and to which said cylinder is pivotally connected at its lower end free to swing with its upper end in the vertical plane of the axle, springs bearing against the upper end of the cylinder and adapted to maintain the same in its normal position, and means for supplying the air chamber above the piston with air under pressure.

4. The combination with the vehicle body and a supporting axle, of a piston provided intermediate its ends with laterally extending clamping boxes securing the piston upon the axle in vertical position, an inclosing cylinder forming air chambers above and below the piston, the one above provided with means for supplying it with air under pressure for supporting the load thereon, a pedestal depending from the underside of the body adjacent to the cylinder and having its lower portion bifurcated and straddling the axle, a bolt passing through the lower end of the cylinder and pivotally securing it between the bifurcated ends of the pedestal, vertical guide flanges on the pedestal coöperating with the clamping box on the adjacent side of the piston to vertically guide the same, parallel guide flanges on the upper end of the pedestal for guiding the upper end of the cylinder and springs pressing against the upper end of the cylinder on opposite sides thereof.

In testimony whereof I affix my signature in presence of two witnesses.

GEORGE WILLIAM BELL.

Witnesses:
OTTO F. BARTHEL,
GORDON C. BENNETT.